United States Patent
Hashimoto et al.

[11] Patent Number: 6,115,767
[45] Date of Patent: Sep. 5, 2000

[54] APPARATUS AND METHOD OF PARTIALLY TRANSFERRING DATA THROUGH BUS AND BUS MASTER CONTROL DEVICE

[75] Inventors: Yuichi Hashimoto, Osaka; Touru Kakiage, Neyagawa; Masato Suzuki, Toyonaka; Yoshiaki Kasuga, Shiga-gun; Jyunichi Yasui, Takatsuki, all of Japan

[73] Assignee: Matsushita Electric Industrial Co., Ltd., Osaka, Japan

[21] Appl. No.: 08/808,017

[22] Filed: Mar. 3, 1997

[30] Foreign Application Priority Data

Mar. 4, 1996 [JP] Japan .................................. 8-045760

[51] Int. Cl.⁷ .................................................. G06F 13/00
[52] U.S. Cl. .............................. 710/107; 710/25; 710/28; 710/32; 710/34; 710/35; 710/45
[58] Field of Search ...................... 395/287, 293, 395/299, 842, 843, 845, 848; 710/107, 113, 119, 28, 22, 23, 25, 32, 34, 35, 45, 124

[56] References Cited

U.S. PATENT DOCUMENTS

| | | | |
|---|---|---|---|
| 4,490,788 | 12/1984 | Rasmussen | 710/21 |
| 4,658,350 | 4/1987 | Eggebrecht et al. | 364/200 |
| 5,212,795 | 5/1993 | Hendry | 395/725 |
| 5,287,486 | 2/1994 | Yamasaki et al. | 395/842 |
| 5,297,242 | 3/1994 | Miki | 395/425 |
| 5,333,274 | 7/1994 | Amimi et al. | 395/275 |
| 5,402,421 | 3/1995 | Hayasaka et al. | 370/85.2 |
| 5,517,196 | 5/1996 | Pakett et al. | 342/70 |
| 5,517,325 | 5/1996 | Shimatani | 358/444 |
| 5,535,362 | 7/1996 | Ami et al. | 395/474 |
| 5,584,033 | 12/1996 | Barrett et al. | 710/105 |
| 5,664,197 | 9/1997 | Kardach et al. | 710/240 |
| 5,717,852 | 2/1998 | Izuno et al. | 395/185.09 |
| 5,729,681 | 3/1998 | Aditya et al. | 395/200.6 |
| 5,752,078 | 5/1998 | Delp et al. | 395/827 |
| 5,752,081 | 5/1998 | Jirgal | 395/842 |

Primary Examiner—Xuan M. Thai
Attorney, Agent, or Firm—Michael K. Kelly; Snell & Wilmer

[57] ABSTRACT

A method of transferring data through a bus includes the steps of: occupying the bus by a first device serving as a bus master; transferring a first predetermined number of data items of all data items to be transferred while the first device is occupying the bus; determining if the first predetermined number of data items have been transferred; determining if the first device should release the bus based on whether or not there is a request from a second device after it is determined that the first predetermined number of data items have been transferred; and releasing the bus by the first device when it is determined that the first device should release the bus.

10 Claims, 5 Drawing Sheets

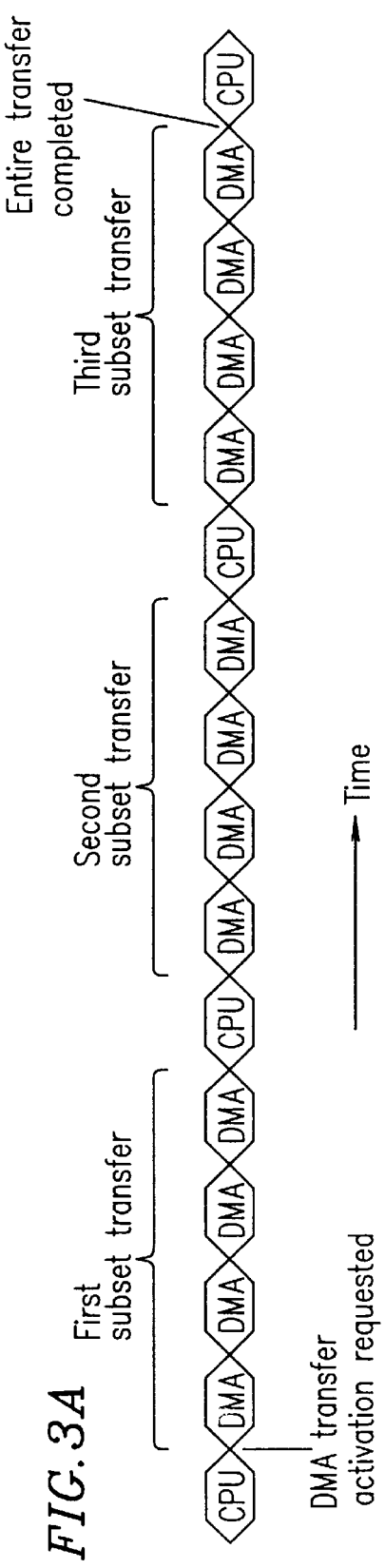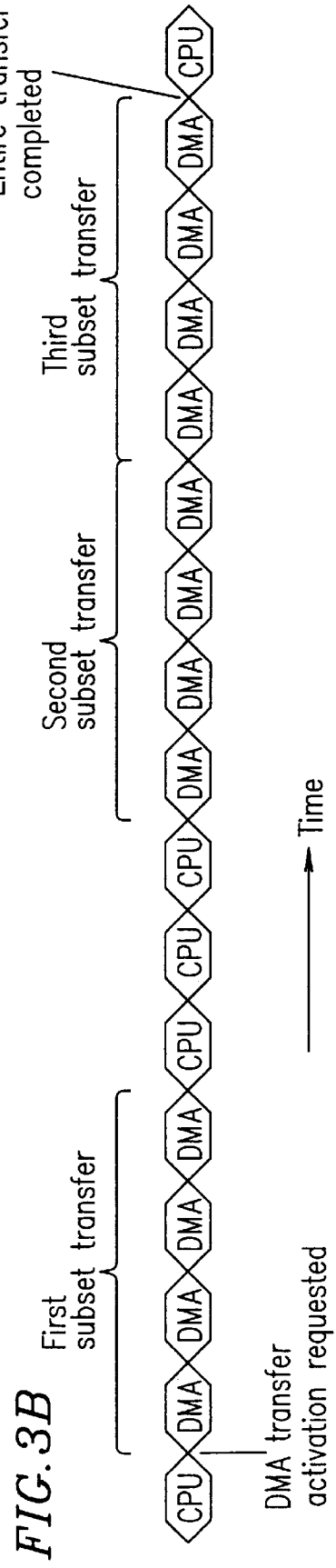

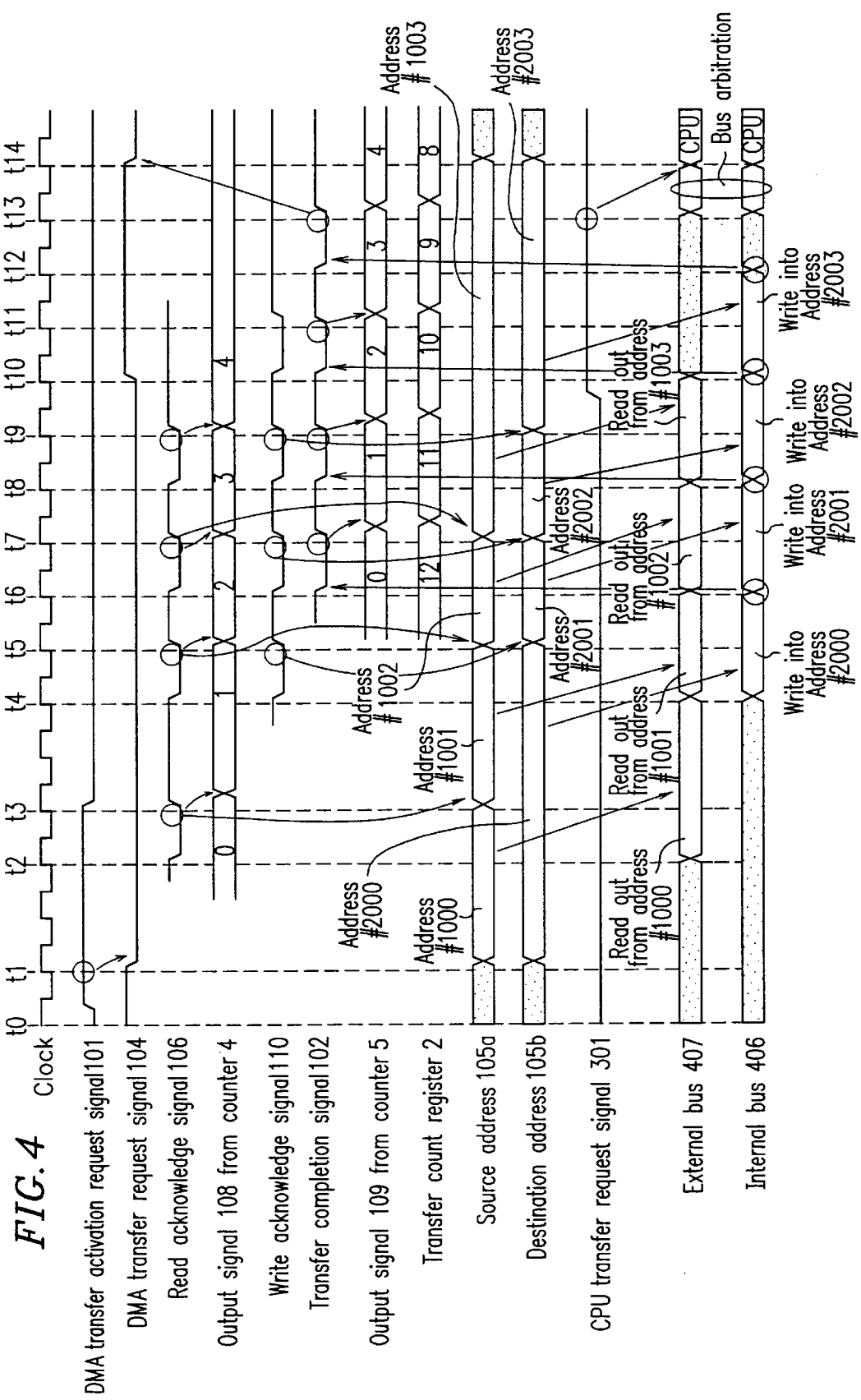

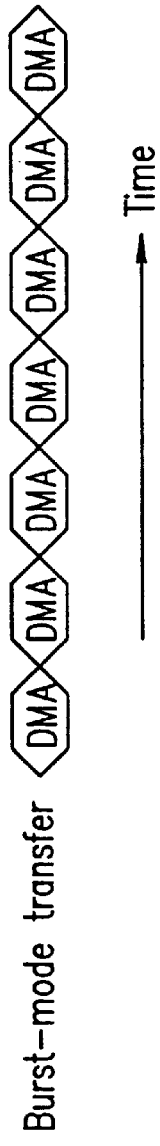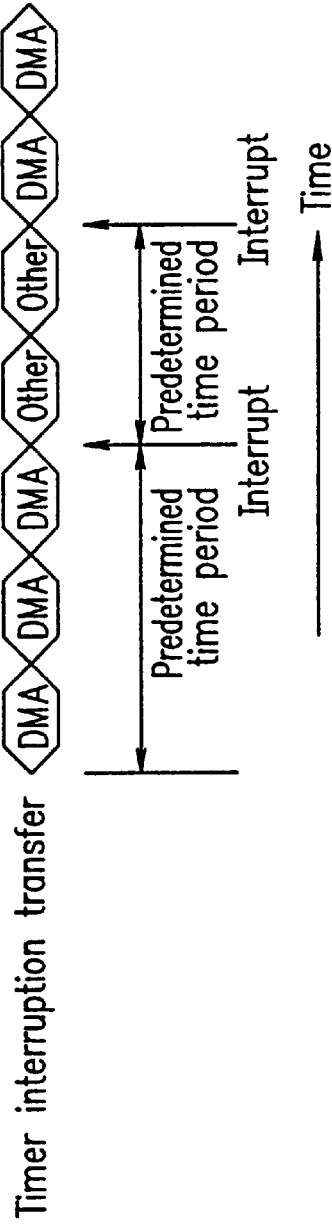
FIG. 5A (PRIOR ART) Burst-mode transfer
FIG. 5B (PRIOR ART) Word-by-word transfer
FIG. 5C (PRIOR ART) Cycle-steal transfer
FIG. 5D (PRIOR ART) Timer interruption transfer

APPARATUS AND METHOD OF PARTIALLY TRANSFERRING DATA THROUGH BUS AND BUS MASTER CONTROL DEVICE

BACKGROUND OF THE INVENTION

1. Field of the Invention

The present invention relates to a method of transferring data through a bus and a bus master control device used in an information processing unit.

2. Description of the Related Art

A DMA (Direct Memory Access) controller is a control device used for performing high-speed data transfers directly between peripheral units (e.g., a memory, an I/O (Input/Output) device) connected to a common bus without involving the CPU.

FIGS. 5A to 5D are schematic diagrams each illustrating a conventional data transfer method using a DMA controller with each hexagonal block representing a single data transfer operation (e.g., a data transfer operation performed for a single word in one cycle). The data transfer operations are performed successively from left to right in the figures. The bus master at each data transfer operation is indicated inside the corresponding block. A bus master is a device which is controlling the current data transfer while occupying the bus. For example, the CPU or the DMA controller may be a bus master. In FIGS. 5A to 5D, the label "DMA" indicates that the DMA controller is occupying the bus as the bus master at the time, whereas "Other" indicates that a bus master other than the DMA controller (e.g., the CPU) is occupying the bus as the bus master at the time.

FIG. 5A illustrates the "burst-mode transfer method" where the bus remains occupied by the DMA controller from activation of a DMA transfer operation to completion of the DMA transfer operation. Accordingly, during burst-mode transfer operations, another device (e.g., the CPU) must wait for a long time until the DMA transfer is completed before it may serve as the bus master and transfer data to and from the memory through the bus. In order to eliminate this long wait during burst-mode transfer operations, there have been proposed other data transfer methods as shown in FIGS. 5B, 5C and 5D.

FIG. 5B illustrates a "word-by-word transfer method" wherein the bus master occupying the bus is forcibly switched between the DMA controller and another device after each one-word data transfer. FIG. 5C illustrates a "cycle-steal transfer method" where the DMA controller serves as the bus master for DMA transfers only when the bus is not occupied by the other device serving as the bus master. FIG. 5D illustrates a "timer interruption transfer method" where the bus master occupying the bus is switched between two devices by interrupts generated at predetermined intervals based on a timer. In the timer interruption transfer method, the DMA controller performing a DMA transfer is forced to discontinue the DMA transfer when the interrupt is generated after a predetermined period of time. The predetermined period of time runs from the activation of the DMA transfer. Once the DMA transfer is forced to discontinue, the other device serves as the bus master and occupies the bus. When another interrupt is generated after the predetermined time, the other device is forced to discontinue serving as the bus master and release the bus so that the DMA controller again can serve as the bus master and resume the interrupted DMA transfer.

For data transfers (e.g., DMA transfers) in a system where a plurality of devices which can serve as bus masters share a common bus, there has been a demand for improving the transfer efficiency for both the DMA controller and the other devices.

In the "word-by-word transfer method", however, the DMA transfer operations cannot be performed successively. Therefore, this method cannot be used to access a memory employing a high-speed transfer mode (e.g., the page mode of a DRAM). This results in a very poor DMA transfer efficiency.

In the "cycle-steal transfer method", besides the above-noted problem, the other devices serving as bus masters may occupy the bus for a long time during which the DMA controller cannot access the bus. In such a case, the DMA controller has to wait for a long time until it is allowed to perform a DMA transfer and, therefore, the DMA transfer may not be completed within a predetermined period of time.

In the "timer interruption transfer method", a first device currently serving as the bus master (i.e., occupying the bus) is forcibly switched to a second device (to act as the bus master) upon a timer-based interrupt even at an undesirable time for the first device currently occupying the bus. This also results in a poor data transfer efficiency.

SUMMARY OF THE INVENTION

According to one aspect of this invention, a method of transferring data through a bus includes the steps of: occupying the bus by a first device serving as a bus master; transferring a first predetermined number of data items of all data items to be transferred while the first device is occupying the bus; determining if the first predetermined number of data items have been transferred; determining if the first device should release the bus based on whether or not there is a request from a second device after it is determined that the first predetermined number of data items have been transferred; and releasing the bus by the first device when it is determined that the first device should release the bus.

In one embodiment of the invention, the method of transferring data through a bus further includes the steps of: occupying the bus by the second device serving as the bus master after the first device releases the bus; releasing the bus by the second device after the second device completes access to the bus; occupying the bus again by the first device after the second device releases the bus; and transferring a second predetermined number of data items subsequent to the first predetermined number of the data items which have been transferred while the first device is occupying the bus again.

In another embodiment of the invention, the method of transferring data through a bus further includes the step of, when it is determined that the first device should not release the bus, transferring by the first device a second predetermined number of data items subsequent to the first predetermined number of the data items which have been transferred while the first device continues to occupy the bus.

In still another embodiment of the invention, the method of transferring data through a bus further includes the steps of: determining if all the data items to be transferred have been transferred; and releasing the bus after it is determined that all the data items to be transferred have been transferred.

In still another embodiment of the invention, the first device is a DMA controller; and the second device is a CPU.

According to another aspect of this invention, a bus master control device for controlling an operation of a bus master for transferring data through a bus includes: bus occupation request means for outputting a signal requesting to occupy the bus in response to a data transfer request; data transfer means for transferring a first predetermined number of data items of all data items to be transferred while the bus master is occupying the bus; and bus release instruction means for outputting a signal instructing to release the bus after the first predetermined number of data items have been transferred.

In one embodiment of the invention, the bus occupation request means outputs again the signal requesting to occupy the bus after the bus release instruction means outputs the signal instructing to release the bus. The data transfer means transfers a second predetermined number of data items subsequent to the first predetermined number of the data items which have been transferred while the bus master is occupying the bus again.

In another embodiment of the invention, the bus release instruction means outputs the signal instructing to release the bus after all the data items to be transferred have been transferred.

In still another embodiment of the invention, the data transfer means includes: a first counter for counting a number of data items which have been transferred out of the first predetermined number of data items; and first determination means for determining if the first predetermined number of data items have been transferred based on an output from the first counter.

In still another embodiment of the invention, the data transfer means includes: a second counter for counting a number of data items which have been transferred out of all the data items to be transferred; and second determination means for determining if all the data items to be transferred have been transferred based on an output from the second counter.

In accordance with the present invention having such a configuration, after a predetermined number of data items are transferred by the first device serving as the bus master, the first device releases the bus according to the presence of a request from the second device. Therefore, the second device does not have to wait for a long time to serve as the bus master even when the first device is performing a data transfer.

After the second device releases the bus, the first device occupies the bus again as the bus master and transfers a predetermined number of data items subsequent to the predetermined number of data items which have been previously transferred. By transferring a predetermined number of data items at a time as described above, the data transfer efficiency is improved for the first device.

Thus, the invention described herein makes possible the advantages of: (1) providing a method of transferring data where, a first device serving as the bus master can occupy the bus until a predetermined number of data items are successively and completely transferred (e.g, in a DMA transfer), while the other device does not have to wait for a long time to perform a data transfer, thereby improving data transfer efficiency for both devices; and (2) providing a bus master control device which also realizes the above effects.

These and other advantages of the present invention will become apparent to those skilled in the art upon reading and understanding the following detailed description with reference to the accompanying figures.

BRIEF DESCRIPTION OF THE DRAWINGS

FIGS. 3A and 3B are schematic diagrams each illustrating an exemplary operation of a DMA transfer according to the example of the present invention.

FIG. 4 is a timing diagram for illustrating the first subset transfer in FIGS. 3A and 3B according to the example of the present invention.

FIGS. 5A to 5D are schematic diagrams each illustrating an operation of a conventional DMA controller.

DESCRIPTION OF THE PREFERRED EMBODIMENTS

Hereinafter, an example of the present invention will be described with reference to FIGS. 1 to 4.

Figure 1:
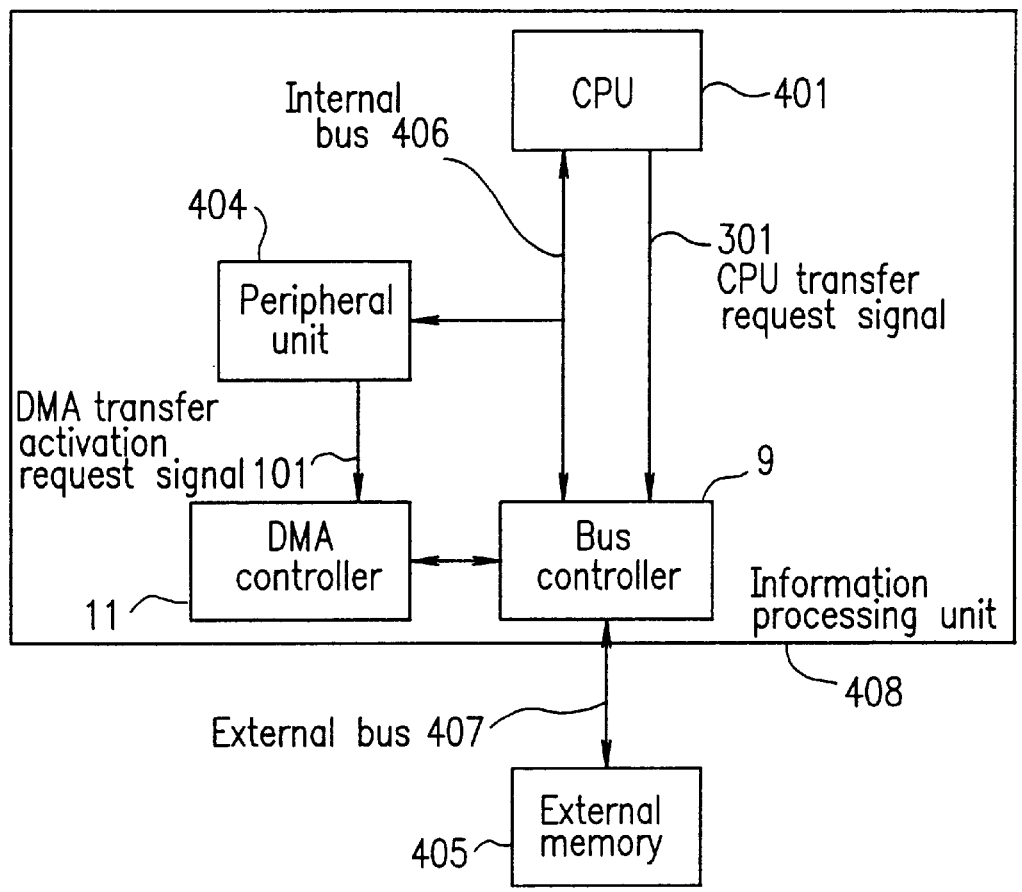
FIG. 1 is a block diagram showing an information processing unit employing a DMA controller according to an example of the present invention.

FIG. 1 is a block diagram showing a configuration of an information processing unit 408. The information processing unit 408 includes a CPU 401, a peripheral unit 404, a DMA controller 11 and a bus controller 9. The CPU 401, the peripheral unit 404 and the bus controller 9 are connected to one another via an internal bus 406. The information processing unit 408 is connected to an external memory 405 via the bus controller 9 and an external bus 407. Reference numeral 301 denotes a CPU transfer request signal output to the bus controller 9 by the CPU 401 requesting occupation over the internal bus 406 and the external bus 407, whereas 101 denotes a DMA transfer activation request signal output to the DMA controller 11 by the peripheral unit 404 requesting a DMA transfer. As will be described later, the DMA controller 11 and the bus controller 9 are connected to each other via lines for carrying control signals and addresses.

The CPU 401 is a central processing unit for performing arithmetic operations and for controlling the whole process of the information processing unit 408. The peripheral unit 404 performs a specified group of processes based on instructions from the CPU 401. The peripheral unit 404 is typically an external memory device (e.g., a hard disk drive or an optical disk drive), a printer or the like. The bus controller 9 controls access to the internal bus 406 and the external bus 407, with the CPU 401 and the DMA controller 11 being devices which may serve as the bus master. When these devices request occupation over the internal bus 406 and the external bus 407, the bus controller 9 arbitrates between the devices 401 and 11 and determines which one of the devices 401 and 11 is to occupy the bus as the bus master. The DMA controller 11 controls data transfers (i.e., DMA transfers) performed directly between the peripheral unit 404 and the external memory 405 without involving the CPU 401 based on a request from the peripheral unit 404.

Figure 2:
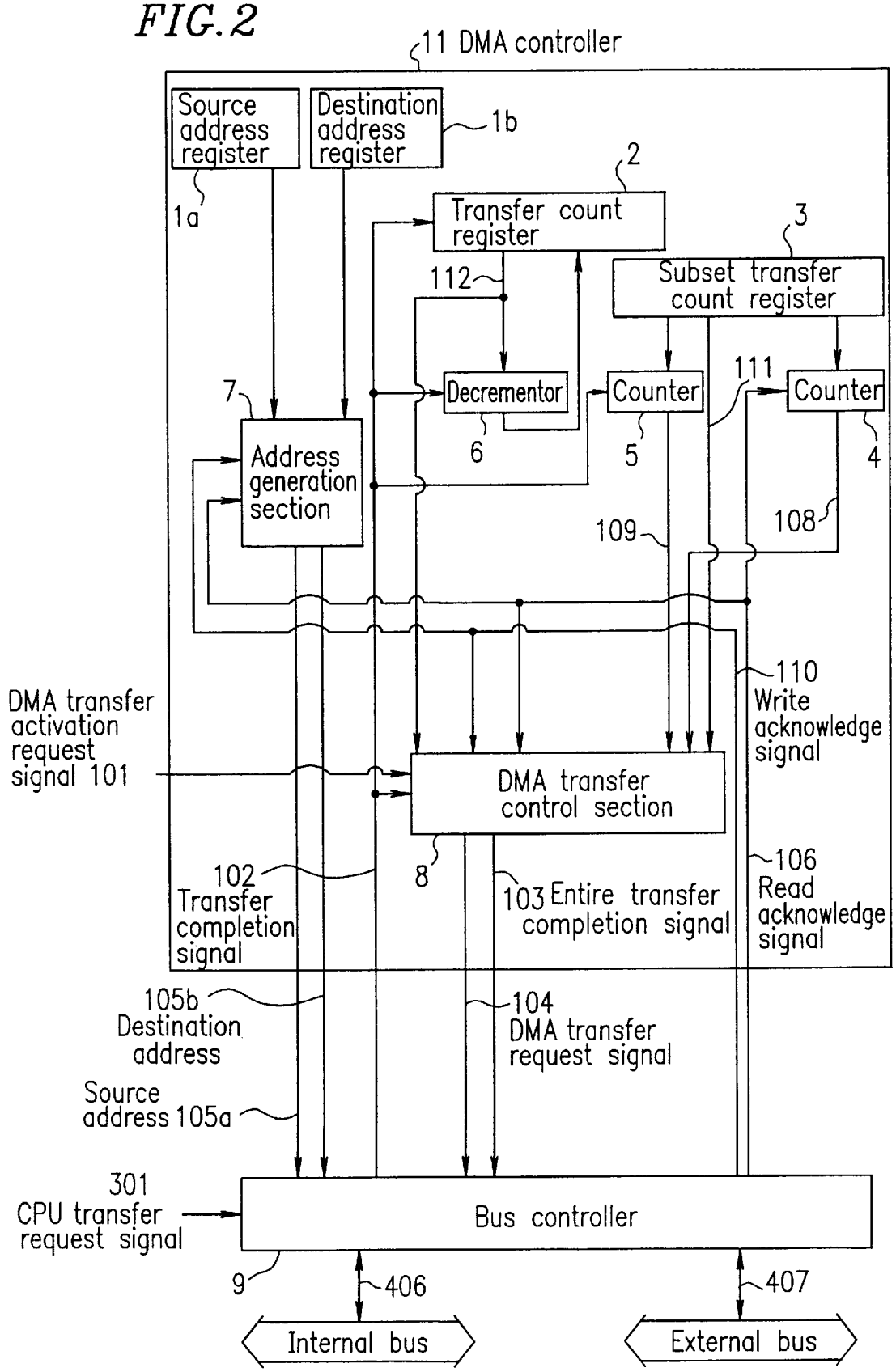
FIG. 2 is a block diagram showing the DMA controller according to the example of the present invention.

FIG. 2 is a block diagram showing the configuration of the DMA controller 11.

The DMA controller 11 includes a source address register 1a, a destination address register 1b and an address generation section 7. The source address register 1a stores a source address for a DMA transfer operation, whereas the destination address register 1b stores a destination address for a DMA transfer operation. An output signal from the source address register 1a and an output signal from the destination address register 1b are input to the address generation section 7. A read acknowledge signal 106 and a write acknowledge signal 110 output from the bus controller 9 are input to the address generation section 7. The read acknowledge signal 106 indicates that the bus controller 9 has accepted a DMA transfer request and has begun to read out data to be transferred by a DMA transfer. The write acknowledge signals 110 indicates that the bus controller 9 has begun to write data to be transferred by a DMA transfer. The address generation section 7 reads out the contents of the source address register 1a and the destination address register 1b as data transfer start addresses, and outputs the data transfer start addresses to the bus controller 9 as a source address 105a and a destination address 105b. Then, based on the read acknowledge signal 106 and the write acknowledge signals 110, the address generation section 7 updates the address from which data is to be read out next and the address into which the data is to be written next, and outputs the updated addresses to the bus controller 9 as the source address 105a and the destination address 105b. Thus, a predetermined number of data items are transferred successively.

The DMA controller 11 further includes a transfer count register 2 and a subset transfer count register 3. The transfer count register 2 stores the number of DMA transfer operations to be performed. The subset transfer count register 3 stores a predetermined number as the number of data items to be transferred in a single subset transfer. The DMA controller 11 intermittently transfers all data items to be transferred by a DMA transfer by transferring a data subset including the predetermined number of data items at a time. In this specification, a "subset transfer" is referred to as an operation of successively transferring a data subset including a predetermined number of data items while the bus is being occupied by the bus master.

The DMA controller 11 further includes counters 4 and 5 and a decrementor 6. The counter 4, which is reset at the beginning of a subset transfer, counts the read acknowledge signal 106 input from the bus controller 9. Thus, the counter 4 indicates the number of data items which have been read out from the respective source addresses out of the predetermined number of data items to be transferred in a single subset transfer. The counter 5, which is also reset at the beginning of the subset transfer, counts a transfer completion signal 102 input from the bus controller 9. The transfer completion signal 102 is output from the bus controller 9 indicating that a single DMA transfer operation for a single data item is completed. Thus, the counter 5 indicates the number of data items which have been written into the respective destination addresses (i.e., the number of data items for which the transfer operation has been completed) out of the predetermined number of data items to be transferred in a single subset transfer. The transfer completion signal 102 is also input to the transfer count register 2 and the decrementor 6. Each time the transfer completion signal 102 is asserted, the decrementor 6 decrements the output value from the transfer count register 2 by one and outputs the resultant value to the transfer count register 2. Thus, the number of data items which have been transferred out of the number of all the data items to be transferred is counted by the transfer count register 2 and the decrementor 6. Consequently, the number of the remaining data items to be transferred is stored in the transfer count register 2.

The DMA controller 11 further includes a DMA transfer control section 8 for controlling DMA transfers. The DMA transfer control section 8 receives as inputs the DMA transfer activation request signal 101, the read acknowledge signal 106, the write acknowledge signals 110, the transfer completion signal 102, an output signal 108 from the counter 4, an output signal 109 from the counter 5, an output signal 111 from the subset transfer count register 3 and an output signal 112 from the transfer count register 2, and the DMA transfer control section 8 outputs an entire transfer completion signal 103 and a DMA transfer request signal 104. The DMA transfer control section 8 asserts the DMA transfer request signal 104 to the bus controller 9 in response to the DMA transfer activation request signal 101 from the peripheral unit 404, thus requesting bus occupation. Based on the output signal 108 from the counter 4, the output signal 109 from the counter 5 and the output signal 111 from the subset transfer count register 3, the DMA transfer control section 8 determines if all the predetermined number of data items to be transferred in a single subset transfer have been transferred. When it is determined that the predetermined number of data items have been transferred, the DMA transfer control section 8 terminates the assertion of the DMA transfer request signal 104 to the bus controller 9, thus instructing bus release. The DMA transfer control section 8 determines if all the data items to be transferred have been transferred based on the output signal 112 from the transfer count register 2. When it is determined that all the data items to be transferred have not been transferred, the DMA transfer control section 8 asserts the DMA transfer request signal 104 again to the bus controller 9 after completion of the current subset transfer, thus requesting to occupy the bus again and similarly control the subsequent subset transfer. When it is determined that all the data items to be transferred have been transferred, the DMA transfer control section 8 terminates the assertion of the DMA transfer request signal 104 to the bus controller 9, thus instructing bus release.

Based on the DMA transfer request signal 104 from the DMA transfer control section 8 and the CPU transfer request signal 301 from the CPU 401, the bus controller 9 arbitrates between the DMA controller 11 and the CPU 401 to determine which one of the devices 11 and 401 is to occupy the internal bus 406 and the external bus 407 as the bus master. When it is determined that the DMA controller 11 is to occupy these buses, the bus controller 9 outputs the source address 105a and the destination address 105b output from the address generation section 7 of the DMA controller 11 to the external bus 407 and internal bus 406, respectively, (or the source address 105a and the destination address 105b to the internal bus 406 and the external bus 407, respectively,) thus controlling read and write operations. The bus controller 9 outputs to the DMA controller 11 the read acknowledge signal 106 indicating that a read operation has begun, and the write acknowledge signal 110 indicating that a write operation has begun.

Hereinafter, the operation of the DMA controller 11 will be described referring to FIGS. 3A, 3B and 4.

FIGS. 3A and 3B are schematic diagrams each illustrating an exemplary operation of the DMA controller 11. As in FIGS. 5A to 5D, data transfer operations are successively performed from left to right in the figures with each hexagonal block representing a single data transfer operation, and the current bus master at each data transfer operation being indicated inside the corresponding block. In FIGS. 3A and 3B, 12 data items are intermittently transferred through three subset transfers with four data items being transferred in each subset transfer. During intervals between two sequential subset transfers, the bus is occupied by the CPU 401. After all the 12 data items are transferred, the DMA controller 11 releases the bus so that the CPU 401 can occupy the bus thereafter.

FIG. 3A shows a case where the CPU 401 occupies the bus for one cycle between each two subset transfers performed by the DMA controller 11. Herein, the period of bus occupation by the CPU 401 is not limited to one cycle as in FIG. 3A but, in fact, the CPU 401 may occupy the bus as long as required. Nevertheless, the CPU 401 typically needs to occupy the bus continuously for only a short time. Therefore, soon after the DMA controller 11 releases the bus to the CPU 401, the DMA controller 11 can regain bus occupation and start transferring a subset of four data items subsequent to the previous subset of four data items.

FIG. 3B shows a case where the CPU 401 occupies the bus for three cycles between the first and second subset transfers. Since the CPU 401 is not requesting bus occupation after the second subset transfer, the DMA controller 11 retains bus occupation and transfers the subsequent data subset.

In both cases, the number of data items to be transferred in a single subset transfer is constant.

FIG. 4 is a timing chart for illustrating the first subset transfer in FIGS. 3A and 3B. FIG. 4 shows the following signals for cycles t0 to t14 based on the clock, in this order: a clock signal which serves as the basis for operation timings for the information processing unit 408; the DMA transfer activation request signal 101; the DMA transfer request signal 104; the read acknowledge signal 106 output from the bus controller 9 to the DMA transfer control section 8 indicating acceptance of a DMA transfer request and beginning of a read operation; the output signal 108 from the counter 4; the write acknowledge signal 110 output from the bus controller 9 to the DMA transfer control section 8 indicating beginning of a write operation; the transfer completion signal 102 output from the bus controller 9 to the DMA transfer control section 8 indicating completion of a single transfer operation for transferring a single data item; the output signal 109 from the counter 5; the transfer count register 2; the source address 105a; the destination address 105b; the CPU transfer request signal 301; the external bus 407; and the internal bus 406.

It should be noted that the DMA transfer activation request signal 101 and the CPU transfer request signal 301 are active-high signals which are asserted when high, whereas the DMA transfer request signal 104, the read acknowledge signal 106, the write acknowledge signal 110 and the transfer completion signal 102 are active-low signals which are asserted when low.

Next, the operation of the DMA controller 11 transferring data from the external memory 405 to the peripheral unit 404 in the above-described information processing unit 408 will be described for each cycle. Herein, three subset transfers are performed to transfer 12 data items from addresses #1000 to #1011 in the external memory 405 to addresses #2000 to #2011 in the peripheral unit 404 with a subset of four data items being successively transferred in a single subset transfer.

(Initial Processes)

First, based on an instruction from the CPU 401 or other external units, the DMA transfer control section 8 sets the source address register 1a to "1000" which is to be the source address, and the destination address register 1b to "2000" which is to be the destination address, and sets the transfer count register 2 and the subset transfer count register 3 to "12" and "4", respectively.

(Cycle t0)

The peripheral unit 404 asserts the DMA transfer activation request signal 101 to the DMA transfer control section 8 of the DMA controller 11.

(Cycle t1)

When detecting that the DMA transfer activation request signal 101 is high and asserted, the DMA transfer control section 8 outputs the DMA transfer request signal 104 (low) to the bus controller 9. Based on an instruction from the DMA transfer control section 8, the address generation section 7 reads out the values of the source address register 1a and the destination address register 1b, and outputs address #1000 as the source address 105a and address #2000 as the destination address 105b to the bus controller 9. The DMA transfer control section 8 also resets the counters 4 and 5.

(Cycle t2)

When detecting that the DMA transfer request signal 104 from the DMA transfer control section 8 is low, the bus controller 9 determines to allow the DMA controller 11 to occupy the bus because the CPU transfer request signal 301 is not asserted. The bus controller 9 begins to read out data from address #1000 in the external memory 405 through the external bus 407 and, simultaneously, outputs the read acknowledge signal 106 (low) to the DMA transfer control section 8.

(Cycle t3)

When detecting that the read acknowledge signal 106 (low) has been input, the address generation section 7 updates the source address 105a to the next address #1001 and outputs the updated source address 105a to the bus controller 9. The counter 4 counts the read acknowledge signal 106, thereby incrementing the value thereof to 1

(Cycle t4)

Upon completion of the read operation from address #1000 through the external bus 407, the bus controller 9 begins to read out data from the next address #1001 in the external memory 405 and begins to write the data, which have been read out from address #1000 in the external memory 405, into address #2000 in the peripheral unit 404 through the internal bus 406. Simultaneously, the bus controller 9 outputs the read acknowledge signal 106 (low) and the write acknowledge signal 110 (low) to the DMA transfer control section 8.

(Cycle t5)

The address generation section 7 updates the source address 105a to the next address #1002 when detecting that the read acknowledge signal 106 (low) has been input, updates the destination address 105b to the next address #2001 when detecting that the write acknowledge signal 110 (low) has been input, and outputs the updated addresses to the bus controller 9. The counter 4 counts the read acknowledge signal 106, thereby incrementing the value thereof to "2". After the read acknowledge signal 106 and the write acknowledge signal 110 are received by the address generation section 7, the bus controller 9 resets these signals to be high again. These signals are reset to be high at the same time in the subsequent data transfer operations, but will not be described hereinafter.

(Cycle t6)

Upon completion of the read operation from address #1001 through the external bus 407, the bus controller 9 begins to read out data from the next address #1002 in the external memory 405 and begins to sprite the data, which have been read out from address #1001 in the external memory 405, into address #2001 in the peripheral unit 404 through the internal bus 406. Simultaneously, the bus controller 9 outputs the read acknowledge signal 106 (low) and the write acknowledge signal 110 (low) to the DMA transfer control section 8. Upon completion of the write operation into address #2000 through the internal bus 406, the bus controller 9 sends the transfer completion signal 102 (low) to the DMA transfer control section 8.

(Cycle t7)

The address generation section 7 updates the source address 105a to the next address #1003 when detecting that the read acknowledge signal 106 (low) has been input, updates the destination address 105b to the next address

2002 when detecting that the write acknowledge signal 110 (low) has been input, and outputs the updated addresses to the bus controller 9. The counter 4 counts the read acknowledge signal 106, thereby incrementing the value thereof to "3", whereas the counter 5 counts the transfer completion signal 102, thereby incrementing the value thereof to "1". Upon receipt of the transfer completion signal 102, the value "12" stored in the transfer count register 2 is decremented by one by the decrementor 6, and the resultant value is output to the transfer count register 2. Thus, a new value "11" is stored in the transfer count register 2.

(Cycle t8)

Upon completion of the read operation from a address #1002 through the external bus 407, the bus controller 9 begins to read out data from the next address #1003 in the external memory 405 and begins to write the data, which have been read out from address #1002 in the external memory 405, into address #2002 in the peripheral unit 404 through the internal bus 406. Simultaneously, the bus controller 9 outputs the read acknowledge signal 106 (low) and the write acknowledge signal 110 (low) to the DMA transfer control section 8. Upon completion of the write operation into address #2001 through the internal bus 406, the bus controller 9 sends the transfer completion signal 102 (low) to the DMA transfer control section 8.

(Cycle t9)

The address generation section 7 updates the destination address 105b to the next address #2003 when detecting that the write acknowledge signal 110 (low) has been input, and outputs the updated addresses to the bus controller 9. The counter 4 counts the read acknowledge signal 106, thereby incrementing the value thereof to "4", whereas the counter 5 counts the transfer completion signal 102, thereby incrementing the value thereof to "2". Upon receipt of the transfer completion signal 102, the value "11" stored in the transfer count register 2 is decremented by one by the decrementor 6, and the resultant value is output to the transfer count register 2. Thus, a new value "10" is stored in the transfer count register 2.

(Cycle t10)

Upon completion of the read operation from address #1003 through the external bus 407, the bus controller 9 begins to write the data, which have been read out from address #1003 in the external memory 405, into address #2003 in the peripheral unit 404 through the internal bus 406. Simultaneously, the bus controller 9 outputs the write acknowledge signal 110 (low) to the DMA transfer control section 8. Upon completion of the write operation into address #2002 through the internal bus 406, the bus controller 9 sends the transfer completion signal 102 (low) to the DMA transfer control section 8.

When detecting that the signal 111 from the subset transfer count register 3 and the signal 108 from the counter 4, which have been input to DMA transfer control section 8, match each other both having the same value "4", the DMA transfer control section 8 determines that a data subset including four data items have been all read out from the respective source addresses, thus terminating the assertion of the DMA transfer request signal 104 and instructing bus release.

(Cycle t11)

The counter 5 counts the transfer completion signal 102, thereby incrementing the value thereof to "3". Upon receipt of the transfer completion signal 102, the value "10" stored in the transfer count register 2 is decremented by one by the decrementor 6, and the resultant value is output to the transfer count register 2. Thus, a new value "9" is stored in the transfer count register 2.

(Cycle t12)

Upon completion of the write operation into address #2003 through the internal bus 406, the bus controller 9 sends the transfer completion signal 102 (low) to the DMA transfer control section 8.

(Cycle t13)

The counter 5 counts the transfer completion signal 102, thereby incrementing the value thereof to "4". Upon receipt of the transfer completion signal 102, the value "9" stored in the transfer count register 2 is decremented by one by the decrementor 6, and the resultant value is output to the transfer count register 2. Thus, a new value "8" is stored in the transfer count register 2.

At this point of time, the CPU transfer request signal 301 from the CPU 401 is high, indicating that the CPU 401 is requesting bus occupation. As the bus controller 9 detects the CPU transfer request signal 301 from the CPU 401, the bus controller 9 performs an arbitration in bus occupation. Since the DMA controller 11 is not requesting bus occupation at this point of time with the DMA transfer request signal 104 being high, the bus controller 9 determines to allow the CPU 401 to occupy the bus at cycle t14.

(Cycle t14)

When detecting that the signal 111 from the subset transfer count register 3 and the signal 109 from the counter 5, which have been input to the DMA transfer control section 8, match each other both having the same value "4", the DMA transfer control section 8 determines that a data subset including four data items have been all written into the respective destination addresses. The DMA transfer control section 8 again outputs the DMA transfer request signal 104 (low) to the bus controller 9 in order to perform the second subset transfer. However, the bus controller 9 has detected the CPU transfer request signal 301 from the CPU 401 at cycle t13 and, as a result of the bus occupation arbitration, the bus controller 9 has allowed the CPU 401 to occupy the bus as the bus master from cycle t14 and has already activated a data transfer operation. This data transfer operation corresponds to the CPU's transfer between the first and second subset transfers in FIG. 3A. Thus, the DMA transfer request signal 104 remains asserted by the DMA controller 11 and is accepted by the bus controller 9 after the CPU 401 releases the bus.

If there is no transfer request signal 301 from the CPU 401, the bus controller 9 accepts the DMA transfer request signal 104 at the cycle following cycle t14. In such a case, the DMA controller 11 consequently retains bus occupation without releasing the bus and performs the subsequent subset transfer.

The first subset transfer is performed as described above while reading out data through the external bus 407 from addresses #1000 to #1003 in the external memory 405 and writing the data through the internal bus 406 into respective addresses #2000 to #2003 in the peripheral unit 404. Subsequently, the second subset transfer shown in FIGS. 3A and 3B begins when the CPU 401 releases the bus and the bus controller 9 detects the DMA transfer request signal 104 which has been asserted since cycle t14. The second subset transfer is performed similarly as the first subset transfer while reading out data through the external bus 407 from addresses #1004 to #1007 in the external memory 405 and writing the data through the internal bus 406 into respective addresses #2004 to #2007 in the peripheral unit 404. Similarly, the third subset transfer is performed while reading out data through the external bus 407 from addresses #1008 to #1011 in the external memory 405 and writing the data through the internal bus 406 into respective addresses

2008 to #2011 in the peripheral unit 404. At the time when the transfer completion signal 102 is asserted for the fourth time in the third subset transfer, the value of the transfer count register 2 is "0". When detecting that the output signal 112 from the transfer count register2 is "0", the DMA transfer control section 8 determines that all the data items to be transferred have been transferred and outputs to the bus controller 9 the entire transfer completion signal 103 for instructing bus release, thus completing the entire transfer operation.

When a DMA data transfer is interrupted by a DRAM refresh operation having a higher priority, the bus may become unavailable for data transfer operations for some cycles. However, since completion of a subset transfer is determined based on the number of data items which have been transferred but not a period of time, the number of data items to be transferred in a subset transfer is always ensured.

Although, in the present example, four data items are transferred in a single subset transfer, the number of data items to be transferred in a single subset transfer is not limited to four. In fact, the number may be set to any appropriate value by setting the subset transfer count register 3 from the CPU 401 or an external unit.

Although the other device which is not the DMA controller 11 is the CPU 401 in the present example, the present invention functions substantially in the same manner with other units serving as the bus master. Moreover, the present invention may be applied to situations where more than two devices that may serve as bus masters coexist.

In the present example, the DMA controller 11 performs data transfers on the intermittent basis by transferring a data subset including a predetermined number of data items at a time. However, the intermittent data transfers may be performed by the CPU 401 while the DMA controller 11 transfers data during intervals between subset transfer operations performed by the CPU 401.

In the present example, completion of a single subset transfer is detected when it is determined that the data subset have been read out from the corresponding source addresses based on the signal 111 from the subset transfer count register 3 and the signal 108 from the counter 4, thus terminating the assertion of the DMA transfer request signal 104 and instructing bus release. However, it is also applicable to detect the completion of a single subset transfer when it is determined that the data subset read out from the corresponding source addresses have been written into the corresponding destination addresses based on the signal 111 from the subset transfer count register 3 and the signal 109 from the counter 5, thus terminating the assertion of the DMA transfer request signal 104 and instructing bus release.

As described above, in accordance with the present invention, after a predetermined number of data items are transferred by the first device currently serving as the bus master, the first device releases the bus according to the presence of a request from the second device desiring to serve as the bus master in order to occupy the bus. Therefore, the second device does not have to wait for a long time to serve as the bus master even when the first device currently serving as the bus master is performing a data transfer of a large amount of data.

After the second device releases the bus, the first device occupies the bus again and transfers a predetermined number of data items subsequent to the predetermined number of data items which have been previously transferred. Moreover, the number of data items to be transferred in a subset transfer is always ensured. Therefore, the data transfer efficiency is improved for the first device serving as the bus master.

Unlike the conventional techniques, the first device currently occupying the bus as the bus master is not forcibly switched to release the bus to a second device based on a predetermined period of time during which the first device is allowed to continuously occupy the bus. Therefore, the number of data items to be successively transferred in a single transfer operation can be ensured even when the period of time from the assertion of the DMA transfer activation request signal to the acceptance of the signal is not constant, or when a DMA data transfer is interrupted by a DRAM refresh operation having a higher priority so that the bus may become unavailable for data transfers for some cycles. In the present invention, the number of data items to be successively transferred in a single subset transfer is always ensured since completion of a data subset transfer is detected based on the number of data items which have been transferred but not on a time period. Data may be transferred more efficiently when each data transfer operation transfers a particular number of data items (e.g., 8 bytes) so as to better correspond to the data processing procedures of the CPU or the peripheral unit. Moreover, data may be transferred even more efficiently when successively transferring, for example, 256-byte data being on the same page as in the high-speed page mode of DRAMs. This is particularly the case where the present invention is most effectively embodied.

While the bus is being occupied by the second device serving as the bus master, the second device is never forced to release the bus based on a time period. Therefore, the data transfer efficiency is also improved for the second device.

As described above, in accordance with the present invention, it is possible to provide a method of transferring data and a bus master control device where the data transfer efficiency can be improved for both devices which may serve as bus masters.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method of transferring data through a bus, comprising the steps of:

continuously occupying the bus by a first device serving as a bus master, said first device continuously occupying the bus for a predetermined period of time;

transferring a first predetermined number of data items of all data items to be transferred while the first device is occupying the bus, the first predetermined number of data items transferring without interruption based on said predetermined period time;

determining if the first predetermined number of data items have transferred;

determining if the first device should release the bus based on whether or not there is a request from a second device after it is determined that the first predetermined number of data items have been transferred; and releasing the bus by the first device when it is determined that the first device should release the bus.

2. A method of transferring data through a bus according to claim 1, further comprising the steps of:

occupying the bus by the second device serving as the bus master after the first device releases the bus;

releasing the bus by the second device after the second device completes access to the bus;

occupying the bus again by the first device after the second device releases the bus; and transferring a second predetermined number of data items subsequent to the first predetermined number of the data items which have been transferred while the first device is occupying the bus again.

3. A method of transferring data through a bus according to claim 1, further comprising the step of, when it is determined that the first device should not release the bus, transferring by the first device a second predetermined number of data items subsequent to the first predetermined number of the data items which have been transferred while the first device continues to occupy the bus.

4. A method of transferring data through a bus according to claim 1, further comprising the steps of:

determining if all the data items to be transferred have been transferred; and releasing the bus after it is determined that all the data items to be transferred have been transferred.

5. A method of transferring data through a bus according to claim 1, wherein:

the first device is a DMA controller; and the second device is a CPU.

6. A master control device for controlling an operation of a bus master for transferring data through a bus, the device comprising:

bus occupation request means for outputting a signal requesting to occupy the bus in response to a data transfer request;

data a transfer means for transfer ring a first predetermined number of data items of all data items to be transferred while the bus master is continuously occupying the bus for a predetermined period of time, said data transfer means configured to transfer said first predetermined number of data items of all data items to be transferred without interruption based on said predetermined period of time;

first determination means for determining if the first predetermined number of data items have been transferred;

bus release instruction means for outputting a signal instructing said bus master to release the bus based on whether or not there is a request from a first device after it is determined that the first predetermined number of data items have been transferred; and bus release means for releasing the bus by the bus master when said bus master release instruction means outputs said signal instructing said bus master to release the bus.

7. A bus master control device according to claim 6, wherein:

the bus occupation request means outputs again the signal requesting to occupy the bus after the bus release instruction means outputs the signal instructing to release the bus; and the data transfer means transfers a second predetermined number of data items subsequent to the first predetermined number of the data items which have been transferred while the bus master is occupying the bus again.

8. A bus master control device according to claim 6, wherein the bus release instruction means outputs the signal instructing to release the bus after all the data items to be transferred have been transferred.

9. A bus master control device according to claim 6, wherein:

the data transfer means comprises a first counter for counting a number of data items which have been transferred out of the first predetermined number of data items, and the first determination means determines if the first predetermined number of data items have been transferred based on an output from the first counter.

10. A bus master control device according to claim 9, the data transfer means comprising:

a second counter for counting a number of data items which have been transferred out of all the data items to be transferred; and second determination means for determining if all the data items to be transferred have been transferred based on an output from the second counter.

* * * * *